3,102,524
VALVE ASSEMBLY FOR INTERNAL COMBUSTION ENGINES
Aldo Celli, Detroit, Mich., assignor to Detroit Aluminum & Brass Corporation, Detroit, Mich., a corporation of Michigan
Filed Sept. 8, 1961, Ser. No. 136,765
5 Claims. (Cl. 123—188)

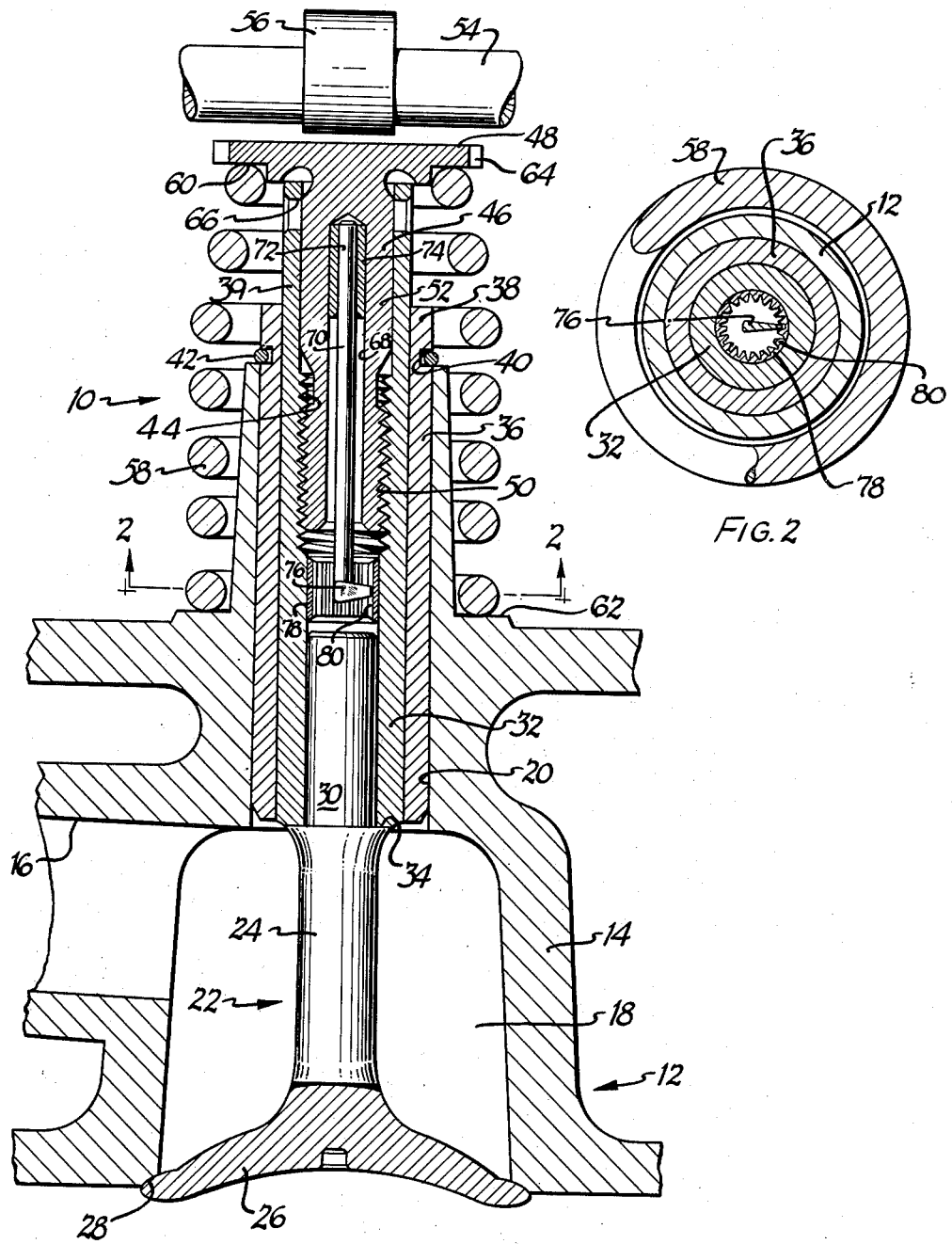

This invention relates to a valve assembly for internal combustion engines, and more particularly to a valve assembly having an adjustable tappet element and an internal locking mechanism to lock the tappet in adjusted positions.

It is considered desirable in the design of internal combustion engines to incorporate a valve assembly which is directly driven from the camshaft. However, due to the difficulty in obtaining the desired adjusted relationship between the cam lobe and the tappet of the valve, prior designs have usually incorporated a push-rod and rocker-arm construction between the camshaft and the valve tappet. This is particularly true of overhead valve constructions.

Constructions in which the valve is driven directly by the camshaft have been adopted in engines built for racing or sport purposes. Also, such constructions have in the past been usually incorporated into L-head engines where the valve is driven from beneath rather than from above. In such constructions, the problems of adjustment are not as acute as in an overhead engine.

Although the purpose of the invention is related to driving of valves directly from the camshaft, it can also be used in engines having the valves driven by a push-rod rocker-arm assembly.

The present invention provides a design in which the valve may be driven from above or below directly by the camshaft. The overall assembly is compact, light-weight, and low in cost.

It is an object of the invention to provide a valve assembly for internal combustion engines which may be directly driven by the engine camshaft.

A further object of the invention is to provide a valve assembly having a releasable internal locking mechanism to allow adjustment between the valve tappet and a cam lobe.

Another object of the invention is to provide a valve assembly comprising only three main elements to result in a simplified and compact construction.

A further object of the invention is to provide a valve assembly in which the valve stem is hollow and is internally splined to engage a resilient pawl mechanism secured to the valve tappet to lock the parts in different adjusted positions.

Other objects of this invention will appear in the following description and appended claims, reference being had to the accompanying drawings forming a part of this specification wherein like reference characters designate corresponding parts in the several views.

In the drawings:

FIGURE 1 is an enlarged side elevational view in section of one embodiment of the valve assembly of the present invention; and FIGURE 2 is a sectional view of the internal locking mechanism taken substantially along the line 2—2 of FIGURE 1 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, it will be seen that the valve assembly 10 is mounted in an engine cylinder head structure 12. The cylinder head structure 12 is located above one of the cylinders of a conventional four-stroke internal combustion engine. The structure 12 comprises an annular wall 14 forming a chamber 18 having a port 16 in communication therewith. The port 16 is representative of either an inlet for a fuel mixture or an outlet for exhaust gases. A passageway 20 is provided in the structure 12 above the chamber 18 to slidingly receive the valve assembly 10.

The valve assembly includes a valve 22 having a stem 24 and valve element 26. The valve element 26 seats on a seat 28 provided at the mouth of chamber 18. In the closed position shown, the valve element 26 seals the chamber 18 from the engine cylinder.

The valve stem 24 has a portion 30 of reduced diameter which is press fitted into a sleeve 32. An annular shoulder 34 is provided on the stem to abut against the lower end of the sleeve and limits insertion of the stem to the proper extent. Press fitting of the valve stem in the sleeve insures concentricity between the sleeve and the valve. If desired, the valve 22 and sleeve 32 may be formed as one part.

The sleeve is slidingly mounted in a guide bushing 36 mounted in the opening 20 of cylinder head structure 12. The upper portion 38 of the bushing extends out of the structure 12. An annular groove 40 is provided in the exterior surface of the bushing and receives a retaining ring 42 to releasably fasten the bushing to the structure 12. This permits removal and replacement of worn bushings.

The sleeve 32 is internally threaded at 44 adjacent the unthreaded upper portion 39 which extends out of the bushing 36. A tappet comprising a shank 46 having an enlarged head 48 is received in sleeve 32. The lower end 50 of tappet shank 46 is externally threaded for threading engagement with the thread portion 44 of the sleeve. The central portion 52 of the tappet shank 46 is unthreaded and is snugly received in the upper portion 39 of the sleeve to insure concentricity of these parts and to relieve any side stresses which may be applied to the tappet or sleeve.

Positioned above the tappet head 48 is a camshaft 54 having a cam lobe 56 to drive the valve assembly. Conventionally, the camshaft is drivingly connected to the crankshaft of the engine and is driven therefrom at a rate equal to one-half of the crankshaft speed.

A coil spring 58 is provided between the underside 60 of the tappet head 48 and a shoulder 62 provided on the structure 12. The spring 58 biases the valve to the closed position shown. Upon rotation of the camshaft, the lobe 56 will contact the tappet head and overcome the force of spring 58 to move the valve to the open position.

The clearance between the lobe 56 and the tappet head 48 is important. It controls the timing of the valve. The valve must be timed to open and close at a precise point in the operation of the engine to insure exhaust or intake to the cylinder at the proper point in the engine cycle. Relative adjustment of the cam lobe and tappet is accomplished by threading the tappet into or out of the sleeve 32. For this purpose, wrench engageable teeth 64 are provided on the tappet head 48 and wrench engageable openings 66 are provided in the upper end of the sleeve to permit the use of a pair of wrenches to facilitate adjustment of the tappet.

Once the tappet has been threaded into the proper adjusted position, it must be locked relative to the sleeve 32 to prevent these parts from relative movement thereafter. As will be appreciated, the vibration of the engine can cause the tappet to thread in or out of the sleeve unless it is locked in position. The means for locking the tappet in place are provided internally of the valve assembly as shown in FIGURES 1 and 2. A recess 68 is provided in the stem 46 of the tappet to receive the resilient shank 70 of a pawl mechanism. The upper end 72 of the shank 70 is press fitted into an insert 74 provided in the recess 68. The insert 74 can be eliminated if desired and the shank 70 can be press fitted into the upper end 72.

The lower end of the shank 70 is deformed to form a pawl 76 which extends at right angles to the longitudinal axis of the shank. The pawl 76 extends into a tubular insert 78 which is secured within the sleeve 32. The insert 78 is internally splined to form teeth 80 which engage the pawl. The pawl 76 and shank 70 are fabricated from a spring material whereby when the tappet is rotated relative to the sleeve 32, the shank 70 will deflect to permit the pawl to pass over the teeth 80. After the pawl 76 has passed over one of the teeth, it will be deflected back to its initial position to thus again move into engagement with a pair of adjacent teeth.

In operation, a turning force of predetermined magnitude is applied to the tappet and sleeve to thread the tappet into or out of the sleeve 32 until the proper adjustment of the tappet head with the cam lobe 56 is obtained. During this adjustment, the pawl will move over the teeth 80 similar to a ratchet action. After the proper adjustment has been made, the pawl will lockingly engage the teeth 80 to provent further relative motion between the tappet and the sleeve 32. The normal vibratory forces exerted on the valve assembly are not sufficient to cause disengagement of the pawl 76 with the teeth 80 and thus the tappet will remain in the desired adjusted position during use.

Having thus described my invention, I claim:

1. A valve assembly for internal combustion engines comprising a valve element having a stem with an internally threaded recess therein; a tappet element having an externally threaded shank threadingly received in said recess; circumferentially spaced teeth on the interior of said recess; detent means on said shank in engagement with a pair of adjacent teeth to releasably lock the shank and stem against relative rotation; said detent means being fabricated from a resilient material whereby upon the application of a predetermined turning force to the shank and the stem, the detent means will deflect and pass over the teeth to permit threading of the shank to different adjusted positions in the stem.

2. In a valve assembly for internal combustion engines comprising a guide structure; a valve including a valve element having a stem portion and a tappet element having a shank portion; at least one of said portions being hollow and interiorly threaded; the other of said portions being exteriorly threaded and threadingly received in the hollow portion for relative longitudinal adjustment, the improvement comprising circumferentially spaced teeth in the interior of the hollow portion; a deflectable detent on the other of said portions to releasably lock the shank and stem against relative rotation, said detent being deflectable upon the application of a predetermined turning force on the shank and the stem to pass over the teeth to permit threading of the shank and the stem to different relative longitudinal positions.

3. A valve assembly for internal combustion engines comprising a guide structure; a valve element having a stem with an internally threaded recess therein; a tappet element having an externally threaded shank threadingly received in said recess; said valve element and tappet element being slidably mounted in the guide structure; circumferentially spaced teeth on the interior of said recess; detent means on said shank in engagement with a pair of adjacent teeth to releasably lock the shank and stem against relative rotation; said detent means being fabricated from a resilient material whereby upon the application of a predetermined turning force to the shank and stem, the detent means will deflect and pass over the teeth to permit threading of the shank to different adjusted positions in the stem.

4. A valve assembly for internal combustion engines comprising a guide structure; a valve element having a stem with an internally threaded recess therein; a tappet element having an externally threaded shank threadingly received in said recess; said valve element and tappet element being slidably mounted in the guide structure; a valve seat associated with the guide structure; spring means biasing said valve element to seat on said seat; a rotatable cam positioned adjacent the tappet to drive the tappet element and valve element against the action of the spring to unseat the valve element; circumferentially spaced teeth on the interior of said recess; detent means on said shank in engagement with a pair of adjacent teeth to releasably lock the shank and stem against relative rotation; said detent means being fabricated from a resilient material whereby upon the application of a predetermined turning force to the shank and stem, the detent means will deflect and pass over the teeth to permit threading of the shank in said valve element to permit positioning of the tappet element to different adjusted positions with respect to the cam.

5. A valve assembly for internal combustion engines comprising a valve element having a stem with an axial recess extending longitudinally inwardly from one end thereof; said recess having an internally threaded portion; circumferentially spaced teeth on the interior of said recess and positioned axially inwardly of said threaded portion; a tappet element having an externally threaded shank threadingly received in said recess; a resilient pawl on said shank in engagement with a pair of adjacent teeth in the recess to releasably lock the shank and stem against relative rotation; said detent means being deflectable upon the application of a predetermined turning force to the shank and stem to pass over the teeth to permit threading of the shank to different adjusted positions in the stem.

References Cited in the file of this patent
UNITED STATES PATENTS

| | | |
|---|---|---|
| 1,100,023 | Link | June 16, 1914 |
| 1,457,957 | Birkigt | June 5, 1923 |
| 1,622,203 | Napier et al. | Mar. 22, 1927 |
| 2,427,153 | Mossberg | Sept. 9, 1947 |
| 2,768,547 | Noell | Oct. 30, 1956 |